United States Patent [19]

Kull

[11] Patent Number: 4,579,491

[45] Date of Patent: Apr. 1, 1986

[54] BLIND FASTENER ASSEMBLY

[75] Inventor: Richard J. Kull, Warminster, Pa.

[73] Assignee: SPS Technologies, Newtown, Pa.

[21] Appl. No.: 581,473

[22] Filed: Feb. 17, 1984

Related U.S. Application Data

[63] Continuation-in-part of Ser. No. 334,993, Dec. 28, 1981, abandoned.

[51] Int. Cl.[4] ............................................. F16B 13/04
[52] U.S. Cl. ...................................... 411/43; 411/18; 411/44; 411/55
[58] Field of Search .................... 411/43, 16, 17, 18, 411/44, 54, 55, 34, 35, 36, 37, 38, 33

[56] References Cited

U.S. PATENT DOCUMENTS

| | | | |
|---|---|---|---|
| 494,745 | 4/1893 | Phillips | 411/55 |
| 2,632,354 | 3/1953 | Black | 411/368 |
| 2,868,056 | 1/1959 | Torre | 411/45 |
| 3,078,002 | 2/1963 | Rodgers | 411/43 X |
| 3,152,375 | 10/1964 | Blakeley | 411/347 |
| 3,192,820 | 7/1965 | Pitzer | 411/33 |
| 3,657,955 | 4/1972 | McKay | 411/38 |
| 3,657,956 | 4/1972 | Bradley et al. | 411/43 |
| 4,033,223 | 7/1977 | Wilson | 411/33 |
| 4,142,439 | 3/1979 | Landt | 411/34 |
| 4,364,697 | 12/1982 | Binns | 411/38 |
| 4,376,604 | 3/1983 | Pratt et al. | 411/44 X |

FOREIGN PATENT DOCUMENTS

| | | | |
|---|---|---|---|
| 63181 | 10/1982 | European Pat. Off. | 411/34 |
| 2641442 | 3/1978 | Fed. Rep. of Germany | 411/54 |
| 1266450 | 5/1961 | France | 411/54 |
| 427175 | 12/1974 | U.S.S.R. | 411/34 |

Primary Examiner—Kenneth J. Dorner
Assistant Examiner—Rodney M. Lindsey
Attorney, Agent, or Firm—Aaron Nerenberg; Stephen Krefman

[57] ABSTRACT

A blind fastener assembly is disclosed, which is suitable for use in joint assemblies including advanced composite materials. The fastener assembly includes a pin, an expander, a sleeve, and an expandable washer, each of which have an initial diameter which permit them to pass through a hole in the workpiece. The washer is mounted about the pin shank between the sleeve and a tapered nose portion of the expander. The fastener assembly is inserted in a hole in the workpiece so that the expander head abuts the workpiece. Rotation of the pin causes the sleeve to force the washer to slide over the tapered nose portion of the expander causing it to expand and abut the blind side of the workpiece. In one embodiment of the invention the pin threadably engages the expander, and the head of the pin is positioned on the blind side of the workpiece. The washer is initially seated in a groove in the pin shank. Rotation of the pin causes its head and the sleeve to advance toward the workpiece, and the washer is forced from the groove by the sleeve causing it to partially expand. Expansion is completed when the sleeve forces the washer over the tapered nose portion of the expander. In a second embodiment the washer is carried on the pin shank and is expanded over the tapered nose portion by rotation of the pin, causing the sleeve to force the washer toward the blind side of the workpiece as in the first embodiment.

20 Claims, 19 Drawing Figures

BLIND FASTENER ASSEMBLY

BACKGROUND OF THE INVENTION

This application is a continuation-in-part of copending U.S. patent application Ser. No. 334,993 filed Dec. 28, 1981, now abandoned.

This invention relates to improvements in blind fasteners and the joints produced therewith.

Advanced composite materials have recently been gaining increasing usage in various aerospace applications because they offer potential weight savings and increased stiffness. The anisotropic properties of composite materials present a unique opportunity to optimize certain structural designs such as elongated aircraft stringers and ribs. In order to form acceptable joints of relatively thin sheet composite materials, conventional blind fasteners have not proven to be completely acceptable.

One reason is the low allowable bearing stress of composite materials which means that the full tensile strength of the blind fastener may not be realized because of bearing failure of the composite material. Present blind fasteners have a relatively limited blind side bearing area and typically expand to approximately 1.3 times the original sleeve diameter. Another reason is that composite materials are weaker in shear, thus causing any holes to require greater edge distances and more area buildup to develop full efficiency of the composite material.

Advanced composite materials are constructed of a resin matrix which has a tendency to crack when holes in the material are expanded, such as by cold working or by an interference fit fastener. Rivets which swell when upset may also crack the resin matrix. Finally, fasteners which form against the blind side composite material surface tend to damage the relatively soft material surface by digging or gouging out some of the material during the bearing surface formation process. Additionally, fasteners which form against the blind side composite material surface may cause stress concentrations during the formation process which exceed the compressive strength limit of such materials, thus causing damage.

Some blind fasteners taught by the prior art form a bearing surface on the blind side of the workpiece before contact is made with the workpiece. However, such fasteners have not proven entirely satisfactory for a variety of reasons, including problems associated with consistently and reliably forming the bearing surface before contact with the workpiece. Additionally, some conventional blind fasteners cannot conform to the irregular contour of the composite material blind surface and tend to crush the raised points of the material, thus reducing overall material strength.

In order to solve these problems, the present invention is directed to an improved blind fastener assembly which has a large bearing area, does not expand the holes in the respective workpieces in which the fastener assembly is installed, is completely formed consistently and reliably away from the blind side workpiece surface, and in which the formation of the blind side bearing surface is not sensitive to variations in grip length.

SUMMARY OF THE INVENTION

Accordingly, it is the general purpose and object of the present invention to provide an improved blind fastener assembly.

It is a further object to provide an improved blind fastener assembly for use with composite materials.

It is yet another object of the present invention to provide an improved blind fastener assembly which is formed away from the blind side workpiece surface.

It is still another object to provide a blind fastener assembly in which the formation of the blind side bearing surface is not sensitive to variations in grip length.

It is yet a further object of the present invention to provide an improved blind fastener assembly which does not expand the holes in the workpieces in which it is installed.

It is another object of the invention to provide a blind fastener assembly in which the blind side bearing surface will conform to an irregular contour of the blind side workpiece surface.

And, it is an object of the present invention to provide a blind fastener assembly which is expandable to approximately 1.4 times its unexpanded diameter.

These and other objects are accomplished according to the present invention by a blind fastener assembly, including a pin, a sleeve, a resilient washer, and an expander. The expander has a head at one end and a tapered nose portion at the other end. The expander and sleeve are both mounted on the pin. The washer is carried on the pin between the tapered nose portion of the expander and the sleeve. The assembly is adapted to be placed through an opening in a workpiece so that a head of the expander abuts the accessible side of the workpiece. Axial movement of the pin causes the sleeve to advance towards the blind side of the workpiece forcing the washer to expand as it slides over the tapered nose portion of the expander, until it is fully expanded and bears against the blind side of the workpiece.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which like numerals refer to like parts and in which.

DESCRIPTION OF THE PREFERRED EMBODIMENT

Figure 1:
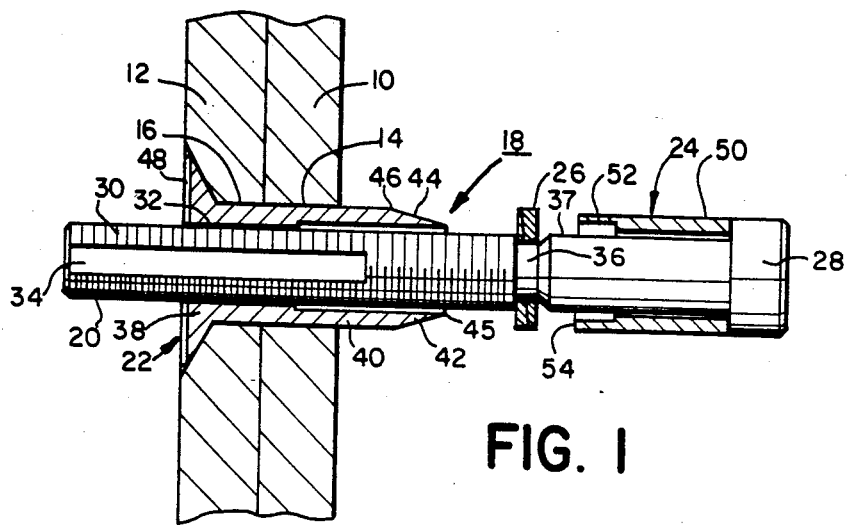
FIG. 1 is a cross sectional view, with parts in elevation, illustrating a first embodiment of a blind fastener assembly installed in a pair of workpieces prior to any forming operation, in accordance with the present invention.

Referring to FIGS. 1 through 6, a first embodiment of a blind fastener assembly in accordance with the present invention is shown in varying stages of installation. Workpieces 10 and 12 which have aligned holes 14 and 16 are shown with a blind fastener assembly 18 passing therethrough. The fastener assembly 18 includes a pin member 20, an expander 22, a sleeve 24, and an expandable, resilient washer 26. The pin member 20 has an enlarged head 28 at one end thereof and may, in one configuration, include standard external threads 30 which are designed to engage mating threads 32 on expander 22. Appropriate rotation of pin 20 with respect to expander 22 will draw the head 28 of the pin toward workpieces 10 and 12, also drawing sleeve 24, which is carried on the shank of pin 20 adjacent to head 28, toward expander 22. In the particular embodiment shown, a wrenching configuration such as a pair of flats 34 are included on pin 20 for accepting a tool driving bit.

Figure 20:
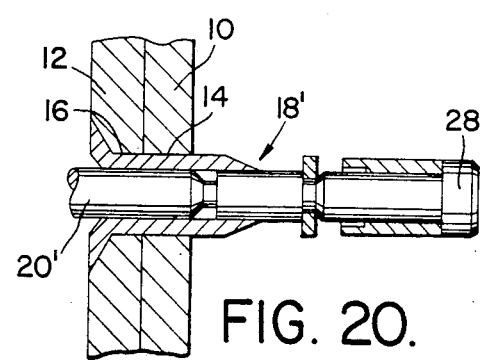
FIG. 20 is an alternate version of a blind fastener assembly in accordance with the present invention.

An alternate version of a blind fastener assembly 18' is shown in FIG. 20. In this version, a pin member 20' of the pull type is used. It should be understood that pin member 20' may include a plurality of circumferential grooves (not shown) instead of external threads 30 and mating threads 32 on expander 22. Such grooves are commonly employed on similar pulling pin devices and are formed to be gripped by any one of a number of conventional pull-type guns for exerting the necessary axial force on pin member 20'. This arrangement is not illustrated because it is quite conventional and fully known to those skilled in the art.

The blind fastener assembly 18' is like the blind fastener assembly 18 in other respects and therefore will not be described in detail herein.

Referring again to FIGS. 1 through 6, pin member 20 includes a groove 36 in its shank. Positioned in the groove is washer 26 which is formed to be radially expandable. Adjacent groove 36 is a shank portion 37 on the outside diameter of the pin.

Expander 22 includes an enlarged head 38 which bears on the workpiece surface, a first shank portion 40 of constant outside diameter which extends through aligned openings 14 and 16 in workpieces 10 and 12, and a nose portion 42 on the end opposite its head 38 having a tapered surface 44. Tapered surface 44 forms an angle on the order of approximately twenty degrees with the longitudinal axis of expander 22, but may generally be within the range of about 15 degrees to 30 degrees. The intersection line between shank portion 40 and tapered surface 44 will be designated as 46, and the forward end of nose portion 42 will be designated as 45.

The head 38 of expander 22 may include a slot 48 for accepting a portion of the power tool bit (not shown) to keep expander 22 from rotating with respect to workpieces 10 and 12, during the assembly of the joint. It is to be understood that head 38 may be of any configuration while still remaining within the scope of the present invention.

Sleeve 24 includes an outside diameter surface 50 and an end 54 facing workpiece 10 which has a counter-bore or area of increased interior radius 52 along an axial portion of the sleeve. As will be subsequently described, the gap which is formed between pin shank 37 and counter-bored region 52 of sleeve 24 is adapted to receive end 45 and tapered surface 44 of expander 22.

Figure 2:
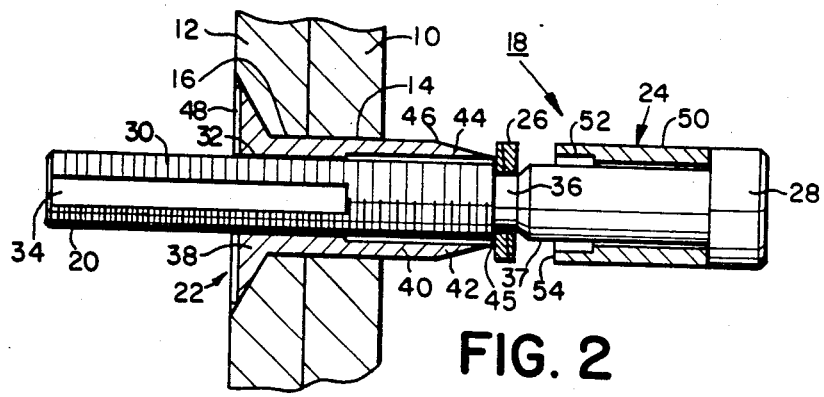
FIG. 2 shows the embodiment of FIG. 1 in a first intermediate position.

During installation of fastener assembly 18, pin 20 is caused to move axially so as to draw head 28 of pin 20 toward expander 22 and, hence, workpieces 10 and 12. Such movement is caused when an axial force is exerted on pin 20 by exerting a torque on pin 20 or by pulling on pin 20 by means of a pull-gun (not shown). Referring to FIG. 2, as the pin is advanced through workpieces 10 and 12, washer 26 is brought into contact with end 45 of the expander nose portion 42. Continued advancement of pin 20 causes nose portion 42 of expander 32 to force washer 26 out of groove 36 and onto shank 37 of pin 20. This necessarily results in a partial radial expansion of washer 26.

Figure 3:
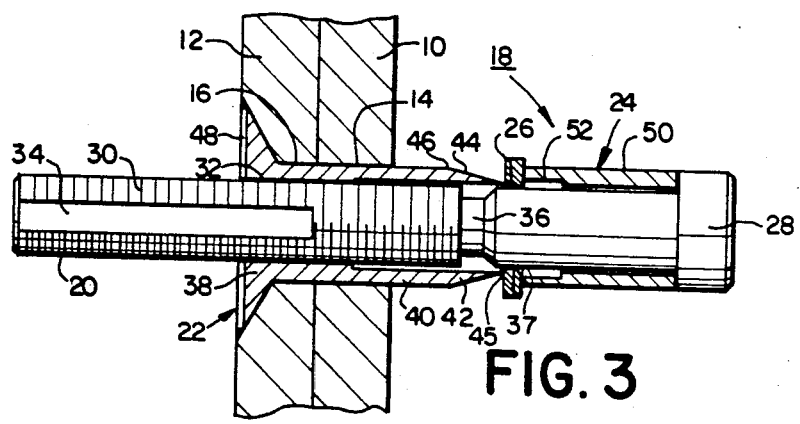
FIG. 3 shows the embodiment of FIG. 1 in a second intermediate position with the washer in a partially expanded condition on the pin.

As is shown in FIG. 3, continued advancement of pin 20 causes the washer to become sandwiched between end 45 of the expander nose portion 42 and end 54 of sleeve 24.

Figure 4:
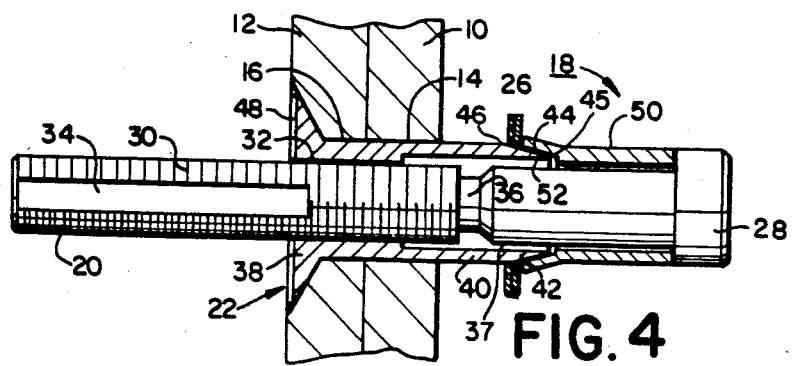
FIG. 4 shows the embodiment of FIG. 1 in a third intermediate position with the sleeve partially expanded and the washer positioned on the tapered nose portion of the expander.

As is shown in FIG. 4, washer 26 is radially expanded again as it is forced onto inclined surface 44 of expander nose portion 42 during further advancement of head 28 toward workpieces 10 and 12. The washer is forced to expand onto tapered surface 44 by end 45 wedging between shank 37 and the inside diameter surface of washer 26. Once the washer is expanded, end 45 advances into the gap between pin shank 37 and counterbored region 52 of sleeve 24, causing the sleeve to expand and advance along tapered surface 44. The washer 26 is fully expanded after it passes intersection line 46.

Figure 5:
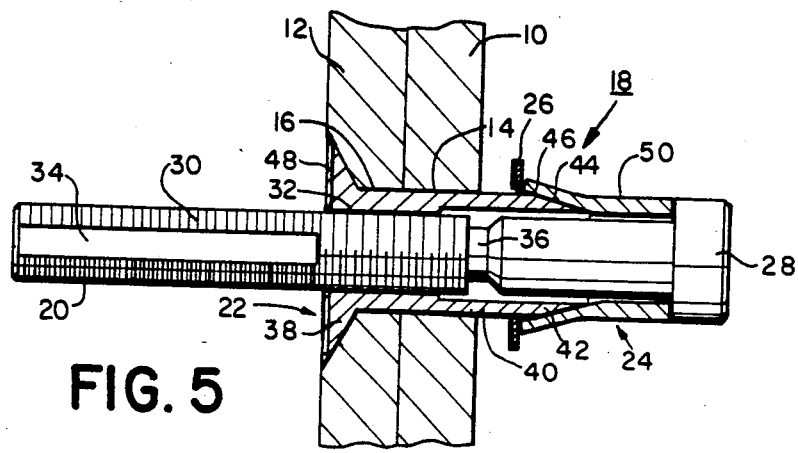
FIG. 5 shows the embodiment of FIG. 1 in a fourth intermediate position with the sleeve partially expanded and the washer fully expanded prior to contacting the blind side workpiece surface.
Figure 6:
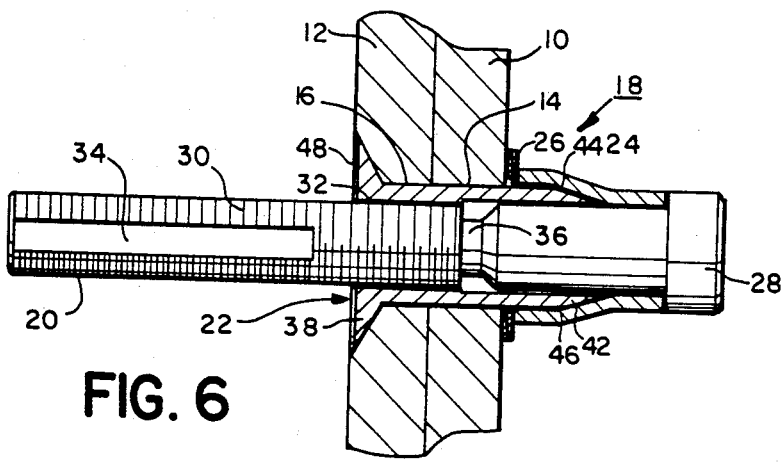
FIG. 6 shows the embodiment of FIG. 1 in a finally formed condition with the washer bearing against the blind side workpiece surface.
Figure 10:
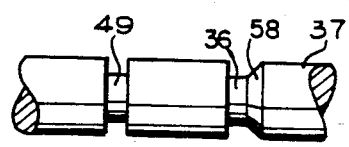
FIG. 10 shows a second embodiment of a pin which may be used with the present invention, having a breakneck groove formed therein.

Continued movement of head 28 and sleeve 24 toward the workpieces causes washer 26 also to move toward the workpieces, resulting in further advancement of the expander nose portion 42 between sleeve 24 and pin shank 37, as is shown in FIG. 5. The washer is ultimately caused to seat against the surface of workpiece 10, as is shown in FIG. 6. Advancement of pin 20 through the workpieces is continued subsequent to the seating of washer 26 against workpiece 10, until the desired preload is reached. Thereupon, the pin fractures at a separate breakneck groove 49, which may be provided, as shown in FIG. 10. It should be understood that some form of locking configuration (not shown) may be provided between pin 20 and expander 22 to keep the pin from moving in an axial direction after the joint is formed, and to maintain the desired preload in the joint. Examples of such a locking configuration could be a prevailing torque feature between the mating threads or any one of the numerous known conventional locking features.

The blind fastener assembly 18 of the present invention has been designed to work reliably and consistently with workpieces which are constructed of advanced composite materials. Advanced composite materials generally have a compressive strength limit within the range of 15,000 to 30,000 psi. Steady state clamping loads, or preloads, for joints of advanced composite materials are generally desired to be of an order of magnitude of approximately 10,000 psi. It is therefore desirable for the surface which is to form the bearing surface on the blind side of such a joint assembly to be formed without requiring contact with the advanced composite material. The present invention provides a member having such a bearing surface by causing washer 26 to become fully expanded prior to its contacting the surface of workpiece 10.

Figure 7:
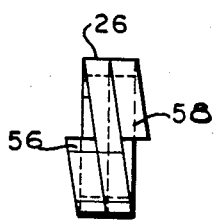
FIG. 7 shows a side elevation view of one embodiment of a washer which may be used in the present invention.
Figure 8:
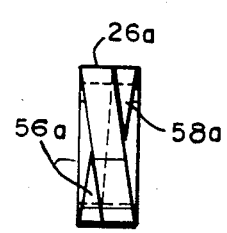
FIG. 8 shows a second embodiment of a washer having tapered ends which may be used with the present invention.
Figure 9:
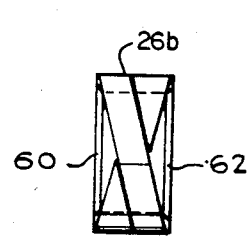
FIG. 9 shows the washer illustrated in FIG. 8 having chamfered interior edges.

One form of washer 26 is shown in FIG. 7 and is formed in the shape of a helical spring having two turns. While a washer having two turns is shown, it should be understood that more or less than two turns could be used. The spring is designed so that when it is fully expanded, there will be no overlap of ends 56 and 58, thus presenting a flat bearing surface to the blind side of the workpiece. Another embodiment of the spring, 26a is shown in FIG. 8 wherein ends 56a and 58a are tapered so that when spring 26a is fully expanded, the tapered end portions will overlap, forming a split washer having uniform thickness. This is desirable since a flatter surface will be presented to the blind side workpiece surface, thereby reducing or eliminating any stress concentrations which might otherwise be produced in the advanced composite material. Washer 26a depicted in FIG. 8 is shown in FIG. 9 as 26b with chamfered edges 60 and 62 formed on its interior end faces. Chamfered edges 60 and 62 permit washer 26b to more easily slide out of groove 36 in pin 20 during installation, and thereafter to more easily permit end 45 of expander nose portion 42 to force itself between washer 26 and pin shank 37. The chamfered edges 60 and 62 may also be formed on the washer shown in FIG. 7.

The shank portion 37 of pin 20 is shown in FIG. 10 with an optional breakneck groove 49. Breakneck groove 49 is formed in the pin so as to cause it to fracture when the desired preload is reached. Washer groove 36 is shown having an inclined face 58, which permits washer 26 to be more easily expanded and forced out of groove 36.

Figure 17:
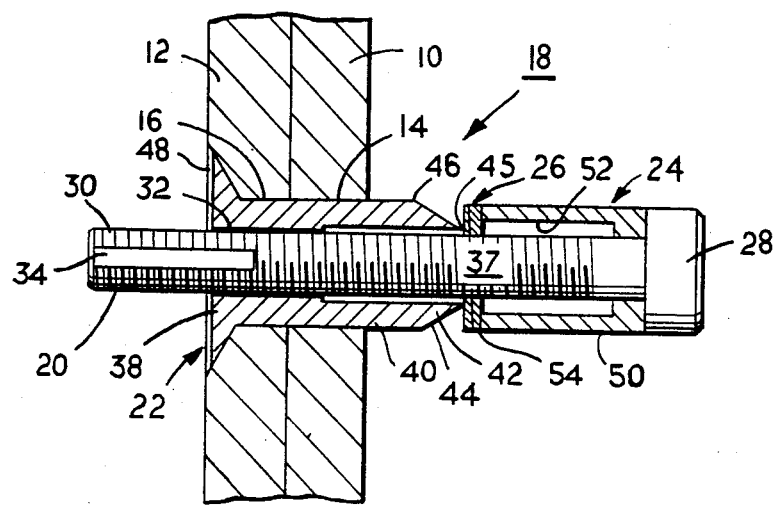
FIG. 17 illustrates a second embodiment similar to the embodiment shown in FIGS. 1-6 with the resilient washer carried on the pin shank prior to any forming operation, in accordance with the present invention.
Figure 18:
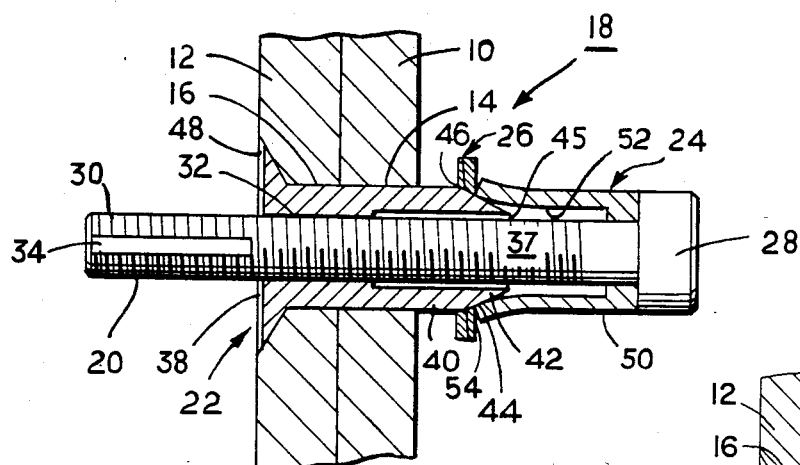
FIG. 18 shows the embodiment of FIG. 17 in an intermediate position with the washer partially expanded on the tapered nose portion of the expander
Figure 19:
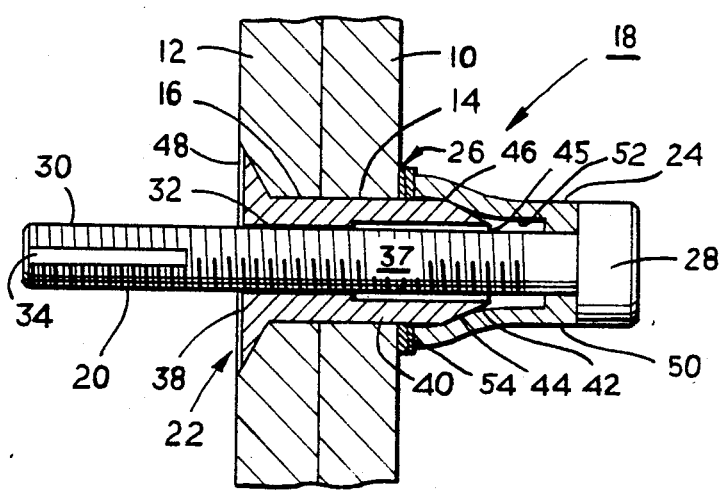
FIG. 19 shows the embodiment of FIG. 17 in a finally formed condition with the washer bearing against the blind side workpiece surface.

A second embodiment is shown in FIGS. 17 through 19. This embodiment is a variation of the first embodiment shown in FIGS. 1 through 6, with the only differences being the elimination of groove 36 in pin member 20, a slightly smaller pin diameter and an increased length of counterbore 52. In this second embodiment resilient washer 26 is carried directly on pin member shank 37 between end 45 of expander nose portion 42 and end 54 of sleeve 24. Preferably, although not necessarily, washer 26 will be wedged between end 45 and end 54 during the assembling of fastener assembly 18 prior to placement into the workpiece holes.

Installation of fastener assembly 18 is accomplished in the same manner as described above for the first embodiment. The part numbers for the first and second embodiments are the same and are shown accordingly in FIGS. 17 through 19. FIG. 17 shows the fastener assembly placed through the aligned holes 14 and 16 in workpieces 10 and 12, respectively, before installation has begun. Pin 20 may be shorter in length than the pin shown in FIGS. 1 through 6 due to the elimination of groove 36, and threads 30 may extend to a point adjacent to head 28. It is to be understood that the length of the threads on pin shank 37 is not critical as long as there are sufficient threads to mate with the threads 32 in expander 22 in the installed position. Counter-bored region 52 on sleeve 24 may be axially longer than in the first embodiment in order to facilitate expansion of the sleeve during installation of the fastener assembly.

During installation, pin 20 is caused to move axially in order to draw head 28 toward expander 22 and workpiece surface 10. This axial movement is caused by the cooperating action of threads 30 on pin 20 and threads 32 on expander 22 when a torque is exerted on pin 20, or by pulling on pin 20 if the threads are eliminated, as previously described. End 45, which is preferably sharp and of a slightly smaller diameter than the inside diameter of washer 26, becomes wedged under the annulus of the washer, and further advancement of the pin causes sleeve end 54 to force the washer over end 45 and onto inclined surface 44 of expander nose portion 42. Continued axial movement of pin 20 causes washer 26 to be further expanded as it moves up inclined surface 44 and causes sleeve 24 to also expand and advance along inclined surface 44, as shown in FIG. 18. The washer becomes fully expanded when it advances onto expander shank portion 40 and ultimately bears against the surface of workpiece 10, as shown in FIG. 19. As in the first embodiment, end 54 of sleeve 24 abuts the washer and causes it to exert the desired clamp load on the workpieces by continued axial movement of pin 20 until the pin fractures. Some form of locking configuration may be provided between pin 20 and expander 22, as in the first embodiment.

Advantages of the second embodiment are (1) reduced pin cost and increased compatibility in shorter grip lengths due to the elimination of the machined groove in the pin, (2) reduced weight and cost of the pin due to its shorter length and smaller diameter, and (3) greater reliability during installation attributable to one less stage of expansion of the washer.

Figure 11:
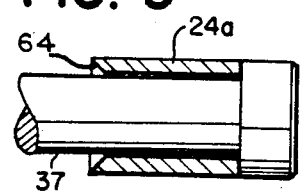
FIG. 11 shows a second embodiment of a sleeve which may be used with the present invention, having a chamfered interior edge.

Another embodiment of the sleeve, 24a, is shown in FIG. 11 in which counter-bore 52 is eliminated and replaced with a chamfered edge 64 on its interior radius on the end facing the blind side workpiece surface. The void region formed by chamfered edge 60 serves the same purpose as counter-bored region 52 (as shown in FIGS. 1 through 3 and FIG. 17) in that it permits expander nose portion 42 to more easily be forced between sleeve 24a and pin shank 37 so as to cause the sleeve to expand and advance along tapered surface 44.

Heretofore, the blind fastener assembly 18 constructed in accordance with the present invention has been described as being particularly well-suited for use with advanced composite materials. It should be understood that this invention can also be used with conventional materials with equally effective results.

Figure 12:
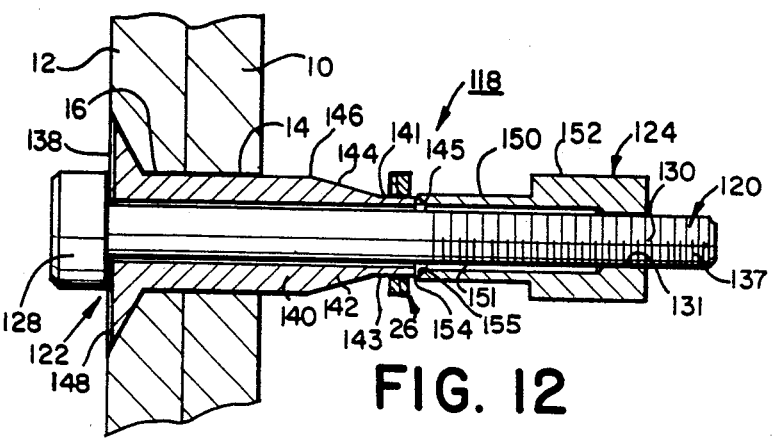
FIG. 12 is a cross sectional view with parts in elevation, illustrating another embodiment of a blind fastener assembly in accordance with the present invention.
Figure 13:
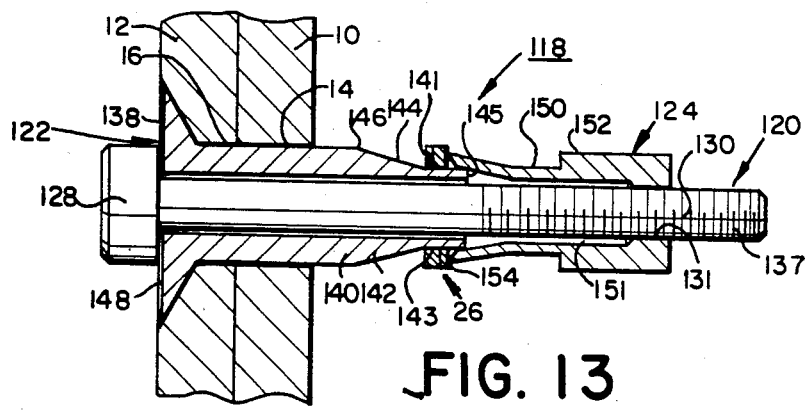
FIG. 13 shows the embodiment of FIG. 12 in a first intermediate position with the washer abutting the tapered nose portion of the expander.
Figure 14:
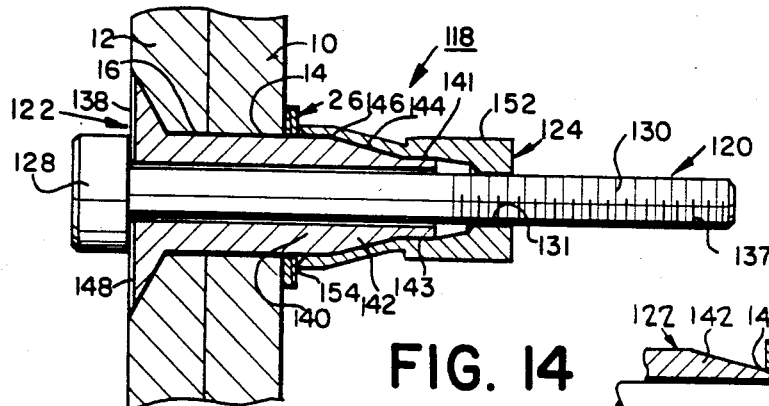
FIG. 14 shows the embodiment of FIG. 12 in a second intermediate position with the washer fully expanded in a finally formed condition bearing against the blind side workpiece surface.

Still another embodiment of the invention is shown in FIGS. 12 through 14. As previously indicated, the primary difference between this embodiment and the previous embodiments is that the orientation of the pin is reversed so that the head is on the accessible side in this embodiment. Additionally, the sleeve threadably engages the pin in this embodiment, whereas the expander threadably engages the pin in the previous embodiments. The fastener assembly 118 includes a pin member 120, an expander 122, a sleeve 124, and the expandable, resilient washer 26. The pin member 120 has an enlarged head 128 at one end thereof and a shank portion 137 that includes standard external threads 130 which are designed to engage mating threads 131 on sleeve 124. Appropriate rotation of the head 128 of pin 120 with respect to expander 122 will draw sleeve 124 toward workpieces 10 and 12 and expander 122.

Expander 122 includes an enlarged head 138 which bears on the workpiece surface, a first shank portion 140 of constant outside diameter which extends through aligned openings 14 and 16 in workpieces 10 and 12, and a nose portion 142 on the end opposite its head 138 having a tapered surface 144. Tapered surface 144 forms an angle on the order of approximately twenty (20) degrees with the longitudinal axis of expander 122, but may generally be within the range of about fifteen (15) degrees to thirty (30) degrees. The intersection line between shank portion 140 and tapered surface 144 will be designated as 146. Protruding from the tapered nose portion 142 of expander 122 is an extended cylindrical portion 141 having an outer surface 143 and a forward end 145.

As in the first embodiment, the head 138 of expander 122 may include a slot 148 for accepting a portion of a power tool bit (not shown) to keep expander 122 from rotating with respect to workpieces 10 and 12 during the assembly of the joint. It is to be understood that head 138 may be of any configuration while still remaining within the scope of the present invention.

The expandable washer 26 is slidably mounted about pin member 120 on the extended portion 141 of expander 122.

An end 154 of sleeve 124 which faces workpiece 10 has a counter-bore or area of increased interior radius 151 along an axial portion of the sleeve and a chamfered region 155. As will be subsequently described, the gap which is formed between pin shank 137 and counter-bored region 151 of sleeve 124 is adapted to receive end 145, surface 141, and tapered surface 144 of expander 122.

Prior to installation of fastener assembly 118, the components are assembled as shown so that end 145 of expander 122 frictionally engages end 154 of sleeve 124. Such frictional engagement is necessary so that sleeve 124 will not rotate, and therefore will advance, upon rotation of pin 120.

During installation of fastener assembly 118, pin 120 is caused to rotate so as to draw sleeve 124 toward expander 122 and, hence, workpieces 10 and 12. Such movement is caused by exerting a torque on the pin, as previously described. Referring to FIG. 13, the sleeve 124 is advanced toward tapered nose portion 142 expanding over end 145 and extended portion 141 of the expander and causing washer 26 to slide over extended portion 141.

As shown in FIG. 14, washer 26 is radially expanded as it is forced onto the inclined surface 144 of expander nose portion 142 during further advancement of sleeve 124 toward workpieces 10 and 12. The washer is forced to expand onto tapered surface 144 by the end 154 of sleeve 124. The washer 26 is fully expanded after it passes intersection line 146. Continued rotation of head 128 and movement of sleeve 124 toward the workpieces causes washer 26 to continue to move toward the workpieces and to ultimately seat against the surface of workpiece 10, as shown in FIG. 14. Advancement of sleeve 124 toward the workpieces is continued subsequent to the seating of washer 26 against workpiece 10, until the desired preload is reached, as determined by a conventional torque wrench.

As shown in FIGS. 12 through 14, sleeve 124 has a region of reduced outer diameter 150 and a region of increased diameter 152. The region of reduced diameter 150 facilitates the expansion of that region as it is forced to expand over the extended nose portion 141 and tapered nose portion 142 of expander 122. The region 152 of increased diameter provides structural support for the interior threaded region 131 of sleeve 124 which engage pin 120.

Figure 15:
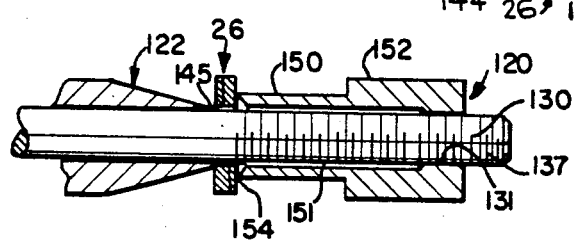
FIG. 15 is an alternate version of the embodiment shown in FIG. 12 without the extended nose portion of the expander with the washer frictionally engaged between the expander tapered nose portion and the sleeve.

This embodiment of the invention is illustrated as having extended nose portion 141, upon which washer 26 is positioned. In another version of this embodiment extended portion 141 may be eliminated, as is shown in FIG. 15. In this version washer 26 rests on pin shank 137 and is frictionally engaged between end 145 of expander 122 and end 154 of sleeve 124.

Figure 16:
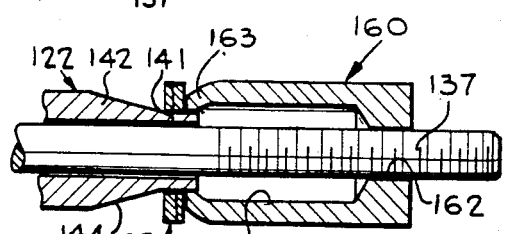
FIG. 16 is an alternate version of a sleeve which may be used with the embodiment of the invention shown in FIGS. 12-14.

An alternate version of a sleeve for use with the embodiment of the invention shown in FIGS. 12 through 14 is shown in FIG. 16. Sleeve 160 is shown mounted on pin shank 137 and frictionally engaged with expander 122. The sleeve has a region of increased interior diameter 161 and threads 162 which engage mating threads on pin shank 137. The end of the sleeve facing the blind side of the assembly is pinched or crimped so as to deform and create a region of reduced interior diameter 163 which is adapted to frictionally engage extended portion 141 of expander 122. Such deformation may be performed on two opposing locations or, as in the preferred embodiment, be performed on three locations.

Both versions of the last embodiment of the invention may use the various configurations of washer 26 which have been previously described and which are shown in FIGS. 7 through 9.

The first two embodiments of the present invention shown in FIGS. 1 through 6 and 17 through 19, respectively, are desirable for those applications wherein maximum bearing surface area is desired, as provided by washer 26. These embodiments provide for a greater degree of expansion of the washer as it has a somewhat smaller initial interior diameter than the washer used in the last two embodiments. However, for most applications the last two embodiments of the invention will be satisfactory. These embodiments have certain manufacturing advantages over the first embodiment resulting from the elimination of the groove in the pin (which is also eliminated in the second embodiment), the lack of a requirement to place interior threads on the expander which is generally constructed of titanium, and, in general, a wider permissible range of manufacturing tolerances.

While the invention has been described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

What is claimed is:

1. A blind fastener assembly, adapted to be installed in a workpiece having a first and a second surface with an opening extended therebetween, said blind fastener assembly comprising:

expander means including an enlarged head at one end thereof formed to bear against the first surface of the workpiece, a tapered nose portion at the other end thereof, a shank portion therebetween, and a bore therethrough, said shank portion being dimensioned to fit into and extend through the opening in the workpiece wherein said tapered nose portion and a portion of said shank portion extend beyond the second surface of the workpiece;

a pin member including an enlarged head and an elongated shank portion extending from said enlarged head, said elongated shank portion being received within said bore in said expander means, one end of said elongated shank portion being disposed adjacent to said tapered nose portion of said expander means and the other end of said elongated shank portion being disposed adjacent to said enlarged head of said expander means;

resilient washer means comprising a coil spring having a predetermined radial thickness and an outer diameter, said coil spring being positioned about said pin member shank portion between said tapered nose portion and said one end of said elongated shank portion of said pin member, said coil spring being dimensioned to fit through the opening in the workpiece in its unexpanded state and being formed to be axially moved toward the second surface of the workpiece and unwound and expanded over said tapered nose portion to its fully expanded condition disposed entirely on said shank portion of said expander means; and expandable sleeve means having a first end and a second end, said expandable sleeve means being carried on said pin member shank portion with said first end disposed adjacent said coil spring and said second end disposed adjacent said one end of said elongated shank portion of said pin member and dimensioned to pass through the opening in the workpiece, said sleeve means having a counterbore at said first end thereof, said counterbore forming an annular wall at said first end having an inner diameter less than the outer diameter of the coil spring and extending over a portion of the axial length of said expandable sleeve means wherein the radial thickness of said annular wall is less than said radial thickness of said coil spring, said second end of said sleeve means being operably engaged with said pin member, said first end of said sleeve means abutting said coil spring and advancing towards the second surface of the workpiece when said pin member is axially displaced relative to said expander means, said sleeve means being proportioned to expand over said expander means tapered nose portion and force said coil spring to expand over said tapered nose portion and said shank portion of said expander means ahead of said first end of said sleeve to said fully expanded condition of said coil spring when said pin member is fully axially displaced such that the entire annular surface bearing area of said coil spring bears against the second surface of the workpiece.

2. The apparatus of claim 1 wherein the ends of said spring are tapered so that said tapered ends overlap upon complete expansion of said washer means, thereby presenting a substantially uniform bearing surface to the second surface of the workpiece.

3. The apparatus of claims 1 or 2 wherein said head of said pin member abuts said head of said expander means and said pin member is threadably engaged with said sleeve means so that rotation of said pin member causes advancement of said sleeve means toward the workpiece second surface thereby causing the expansion of said washer means.

4. The apparatus of claim 1 wherein said pin member is slidably engaged with said expander means so that pulling of said pin member will cause said advancement.

5. The apparatus of claim 1 wherein said pin member is threadably engaged with said expander means so that rotation of said pin member will cause said advancement.

6. The apparatus of claims 1, 2, 4 or 5 wherein said head of said pin member is positioned on the side of the workpiece having the second surface, said pin member being adapted to be advanced through said expander means thereby causing said head of said pin member to force said sleeve means against said washer means and advance said washer means toward the second surface of the workpiece.

7. The apparatus of claim 1 wherein said washer means rests on the surface of said pin member shank portion and is juxtaposed from said expander means nose portion and the end of said sleeve means facing the workpiece.

8. The apparatus of claim 4 or 1 wherein said pin member shank portion has a first circumferential groove formed therein between said expander means nose portion and said sleeve means adapted to carry said expandable washer means in its unexpanded state.

9. The apparatus of claim 8 wherein said first groove includes a surface sloping toward the end of said pin member which passes through the workpiece opening to facilitate the removal and expansion of said expandable washer means from said first groove 10. The apparatus of claim 2 wherein said washer means has a chamfered interior edge adjacent the surface of said pin member shank portion to facilitate expansion of said washer means by said expander means nose portion.

11. The apparatus of claim 1 wherein said pin member further includes a groove in said shank portion thereof designed to break at a predetermined load.

12. The apparatus of claim 1 wherein the blind fastener assembly includes the joint formed with the workpiece having the first and second surface with the opening therebetween.

13. The blind fastener assembly of claim 1,
wherein said enlarged head of said pin member abuts said enlarged head of said expander means; and
wherein said expandable sleeve means is threadably engaged about said pin member between said washer means and said one end of said elongated shank portion of said pin member; said expandable sleeve means is operably caused to advance toward the workpiece due to rotation of said pin member.

14. The apparatus of claim 13 wherein said expander means includes an extended portion extending from said nose portion, said washer means being mounted about said pin member on said expander means extended portion.

15. The apparatus of claim 1 wherein the end of said sleeve means having said counter-bored region has a chamfered surface.

16. The apparatus of claim 1 wherein said sleeve means includes a region of increased outer diameter having threads which engage said pin member.

17. The apparatus of claims 13 or 14 wherein said end of said sleeve means facing the second surface of the workpiece is inwardly deformed to create a region which is adapted to frictionally engage said expander means.

18. The blind fastener assembly of claim 1 wherein said shank portion of said expander means is of constant diameter.

19. A joint assembly comprising:
a workpiece having a first surface, a second surface, and an opening extended therebetween; and
a blind fastener assembly comprising:
expander means including an enlarged head at one end thereof bearing against said first surface of said workpiece, a tapered nose portion at the other end thereof, a shank portion therebetween, and a bore therethrough, a portion of said shank portion being disposed in said opening in said workpiece wherein said tapered nose portion and an other portion of said shank portion extend beyond said second surface of said workpiece;
a pin member including an enlarged head and an elongated shank portion extending from said enlarged head and partially disposed in said bore in said expander means, one end of said elongated shank portion being disposed adjacent to said tapered nose portion of said expander means and the other end of said elongated shank portion being disposed adjacent to said enlarged head of said expander means;
resilient washer means comprising a coil spring having a predetermined radial thickness and an outer diameter, said coil spring being fully expanded and disposed entirely on said shank portion of said expander means and having its entire annular surface bearing area bearing against said second surface of said workpiece; and
expandable sleeve means having a first end and a second end, said expandable sleeve means carried on said pin member shank portion with said first end disposed adjacent said coil spring and said second end disposed adjacent said one end of said elongated shank portion of said pin member, said sleeve means having a counterbore at said first end thereof, said counterbore forming an annular wall at said first end having an outer diameter less than the outer diameter of the coil spring and extending over a portion of the axial length of said expandable sleeve means wherein the radial thickness of said annular wall is less than said radial thickness of said coil spring, said second end of said sleeve means being operably engaged with said pin member, wherein said first end of said sleeve means is expanded over and in contact with said tapered nose portion and said shank portion of said expander means, and wherein said sleeve means abuts said coil spring and causes said coil spring to exert a compressive force on said second surface of said workpiece.

20. The joint assembly of claim 19 wherein said enlarged head of said pin member is disposed at said one end of said elongated shank portion thereof and further wherein said elongated shank portion of said pin is threadably interconnected with said expander means.

* * * * *